United States Patent [19]

Shuert

[11] Patent Number: 5,470,641
[45] Date of Patent: Nov. 28, 1995

[54] PANEL STRUCTURE

[76] Inventor: Lyle H. Shuert, 70 Kingsley Manor Dr., Bloomfield Hills, Mich. 48304

[21] Appl. No.: 166,730

[22] Filed: Dec. 14, 1993

Related U.S. Application Data

[63] Continuation-in-part of Ser. No. 993,762, Dec. 18, 1992, Pat. No. 5,401,347.

[51] Int. Cl.$^6$ .............................. B32B 3/12; B32B 3/30; B65D 19/32
[52] U.S. Cl. .......................... 428/178; 108/51.1; 108/901
[58] Field of Search ................................... 428/178, 179, 428/180; 108/51.1, 901

[56] References Cited

U.S. PATENT DOCUMENTS

| | | | |
|---|---|---|---|
| 3,444,034 | 5/1969 | Hewett | 156/156 X |
| 4,279,204 | 7/1981 | Propst | 108/53.3 |
| 4,348,442 | 9/1982 | Figge | 428/178 X |
| 4,397,247 | 8/1983 | Lemelson | 108/57.1 |
| 4,488,496 | 12/1984 | Polacco | 108/51.3 |
| 4,495,237 | 1/1985 | Patterson | 428/178 |
| 4,518,643 | 5/1985 | Francis | 428/179 X |
| 4,606,278 | 8/1986 | Shuert | 108/51.1 |
| 4,879,956 | 11/1989 | Shuert | 108/53.3 |
| 4,967,533 | 11/1990 | Weisse | 428/180 X |
| 5,030,501 | 7/1991 | Colvin et al. | 428/178 |

Primary Examiner—Michael W. Ball
Assistant Examiner—Francis J. Lorin
Attorney, Agent, or Firm—Young, MacFarlane & Wood

[57] ABSTRACT

A panel structure including four plastic sheets arranged in layered relationship and including an upper sheet, a lower sheet, an upper intermediate sheet positioned beneath the upper sheet, and a lower intermediate sheet positioned between the upper intermediate sheet and the lower sheet. The upper intermediate sheet includes a planar main body portion and a plurality of spaced downwardly extending bosses opening in the upper face of the upper intermediate sheet and each including an annular side wall and a lower end. The lower intermediate sheet includes a planar main body portion and a plurality of spaced upwardly extending bosses opening in the lower face of the lower intermediate sheet and each including an annular side wall and an upper end. The lower ends of the downwardly extending bosses are fused to the upper face of the lower intermediate sheet between adjacent upwardly extending bosses; the upper ends of the upwardly extending bosses are fused to the lower face of the upper intermediate sheet between adjacent downwardly extending bosses; and the adjacent annular side walls of the upwardly and downwardly extending bosses are fused together. The upper sheet is fused to the upper face of the upper intermediate sheet in overlying relation to the boss openings in the upper intermediate sheet and the lower sheet is fused to the lower face of the lower intermediate sheet in underlying relation to the boss openings in the lower intermediate sheet.

17 Claims, 8 Drawing Sheets

5,470,641

PANEL STRUCTURE

RELATED APPLICATION

This application is a continuation in part of U.S. patent application Ser. No. 993,762, filed on Dec. 18, 1992 now U.S. Pat. No. 5,401,347.

BACKGROUND OF THE INVENTION

This invention relates to panel structures and more particularly to panel structures formed of plastic sheet material.

Panel structures are in wide use for construction purposes and fabricating purposes. Prior art panel structures have been formed of either metal, a paper product such as cardboard, wood, or synthetic materials such as plastic. Panel structures ideally are lightweight, strong, durable and maintenance-free, provide all-weather performance, and are relatively inexpensive. Whereas a plurality of metal, paper, wood, and plastic panel structures have been proposed over the years, none have totally satisfied all of the above-noted criteria.

SUMMARY OF THE INVENTION

This invention is directed to the provision of an improved panel structure that is lightweight, strong, durable, provides all-weather performance, and is relatively inexpensive.

The invention panel structure includes four plastic sheets arranged in a layered relationship and including an upper sheet, a lower sheet, an upper intermediate sheet positioned beneath the upper sheet, and a lower intermediate sheet positioned between the upper intermediate sheet and the lower sheet.

According to the invention, the upper intermediate sheet includes a planar main body portion and a plurality of spaced downwardly extending bosses opening in the upper face of the upper intermediate sheet and each including an annular side wall and a lower end; the lower intermediate sheet includes a planar main body portion and a plurality of spaced upwardly extending bosses opening in the lower face of the lower intermediate sheet and each including an annular side wall and an upper end; the lower ends of the downwardly extending bosses are fused to the upper face of the lower intermediate sheet between adjacent upwardly extending bosses; the upper ends of the upwardly extending bosses are fused to the lower face of the upper intermediate sheet between adjacent downwardly extending bosses; the upper sheet is fused to the upper face of the upper intermediate sheet in overlying relation to the boss openings in the upper intermediate sheet; and the lower sheet is fused to the lower face of the lower intermediate sheet in underlying relation to the boss openings in the lower intermediate sheet. This panel construction is lightweight, strong, durable, maintenance-free, provides all-weather performance, and is relatively inexpensive.

According to a further feature of the invention, the annular side walls of at least some of the downwardly extending bosses of the upper intermediate sheet are fused to the annular side walls of upwardly extending bosses of the lower intermediate sheet. The side wall fusion adds significantly to the overall strength of the panel.

According to a further feature of the invention, the downwardly extending bosses on the upper intermediate sheet and the upwardly extending bosses on the lower intermediate sheet are arranged in corresponding patterns with spaces between the bosses in each pattern and the bosses on the upper intermediate sheet are interdigitated with the bosses on the lower intermediate sheet. The interdigitated and fused together arrangement of the upwardly and downwardly extending bosses provides an extremely rigid panel structure for a given amount of plastic material.

According to a further feature of the invention, the upper and lower sheets have a thickness greater than the thickness of the intermediate sheets. Forming the upper and lower portions of the panel structure from sheets that are separate from the sheets forming the intermediate portion of the panel structure allows the thickness of the upper and lower sheets to be determined independently of the thickness and strength requirements of the sheets forming the intermediate portion so that, in each case, an optimal thickness may be selected for each sheet to provide a desired final panel structure thickness and strength.

DETAILED DESCRIPTION OF THE PREFERRED EMBODIMENT

Figure 1:
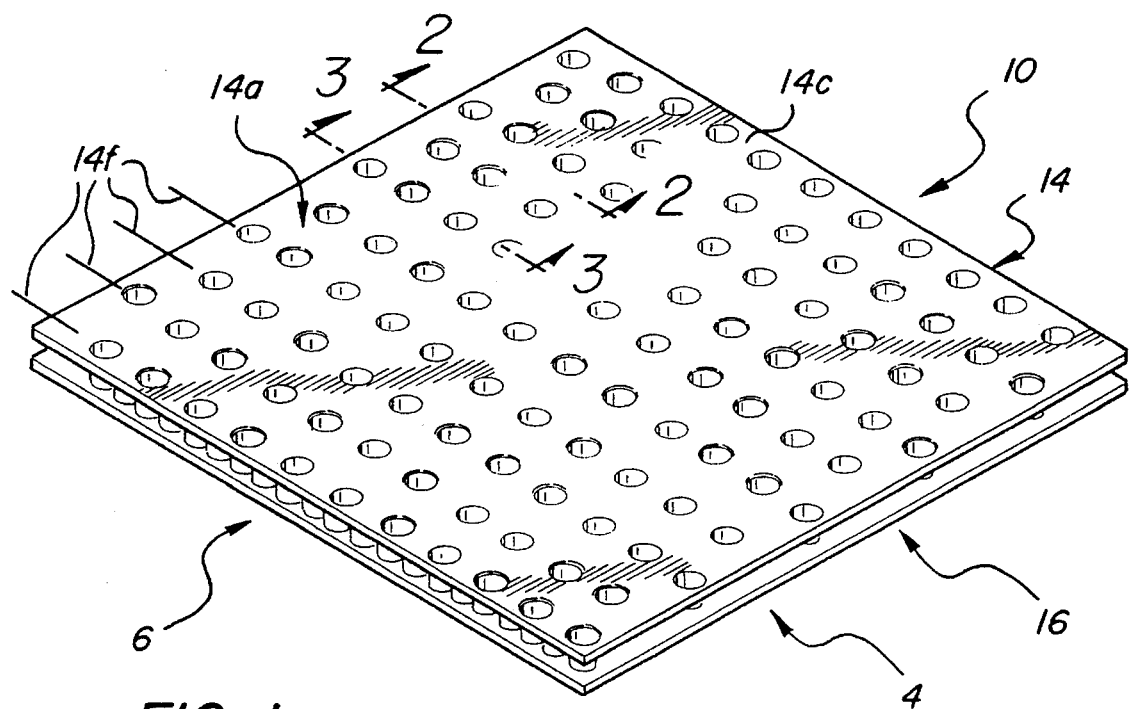
FIG. 1 is a perspective view of a panel structure according to the invention.

In broad overview, the panel structure 10 seen in FIGS. 1–9 and the further panel structure 30 seen in FIGS. 10–15 are both preferably formed in a vacuum forming process preferably embodying a plastic twin sheet construction employing two polyethylene sheets or skins which are selectively thermoformed and are then fused or knitted together at various points, while still in a heated state, to form the twin sheet construction of the panel.

Panel structure 10 is formed from a thermoformed, selectively configured upper sheet 14 and a thermoformed, selectively configured lower sheet 16. In the disclosed panel structure, each sheet 14 and 16 has a generally rectangular configuration but the configuration of the sheets will of course vary depending upon the desired configuration of the final panel structure.

Sheet 14 is formed in known manner in coaction with an upper vacuum forming mold 18 and sheet 16 is formed in known manner in coaction with a lower vacuum forming mold 20. Specifically, sheet 14 is heated, positioned in underlying relation to the mold 18, and then sucked upwardly into conformance with the surface 18a of the mold 18 utilizing vacuum ports 18b. Similarly, sheet 16 is heated, positioned in overlying relation to mold 20, and sucked downwardly into conformance with the surface 20a of mold 20 utilizing vacuum ports 20b. After the sheets have been thus thermoformed, and with the sheets still in a heated flowable state, the molds 18 and 20 are moved together to selectively fuse the upper sheet to the lower sheet.

Molds 18 and 20 are configured such that, following the thermoforming operation, each sheet includes a generally planar main body portion and a plurality of spaced hollow bosses extending from the planar main body portion.

Specifically, upper sheet 14 is thermoformed to include a generally planar main body portion 14a and a plurality of spaced hollow bosses 14b opening in the upper or outer surface 14c of the main body portion and including downwardly tapering conical annular side wall portions 14d extending downwardly from the main body portion and terminating in inner or bottom circular wall portions 14e. Bosses 14b are arranged in rows 14f with each row staggered with respect to the next adjacent row so that the bosses in one row are positioned generally between adjacent bosses in adjacent rows.

Similarly, lower sheet 16 is thermoformed to include a main body portion 16a and a plurality of spaced hollow bosses 16b opening in the lower or outer surface 16c of the main body portion and including upwardly tapering conical annular wall portions 16d extending upwardly from the main body portion 16a and terminating in upper or inner circular wall portions 16e. Bosses 16b are arranged in rows 16f with each row staggered with respect to the next adjacent row so that a boss in one row is positioned between adjacent bosses in an adjacent row.

Figure 2:
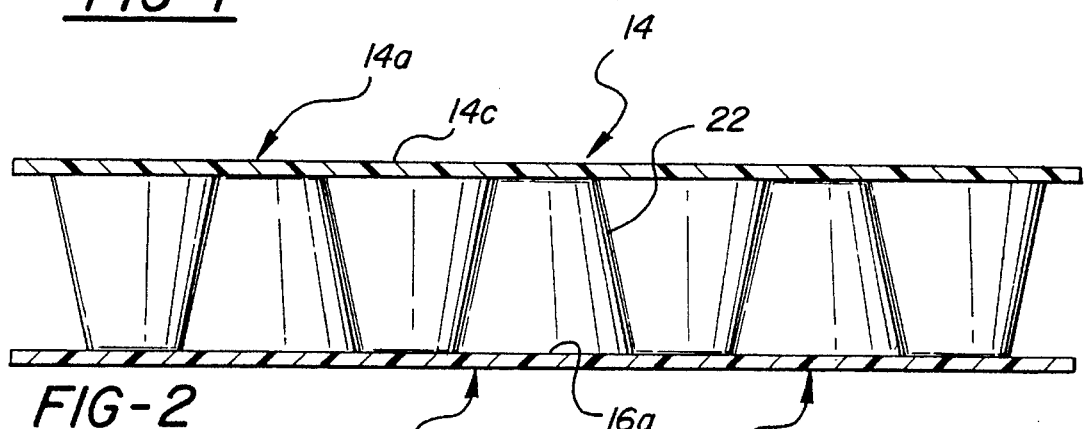
FIGS. 2 and 3 are cross-sectional views taken respectively on lines 2—2 and 3—3 of FIG. 1.
Figure 3:
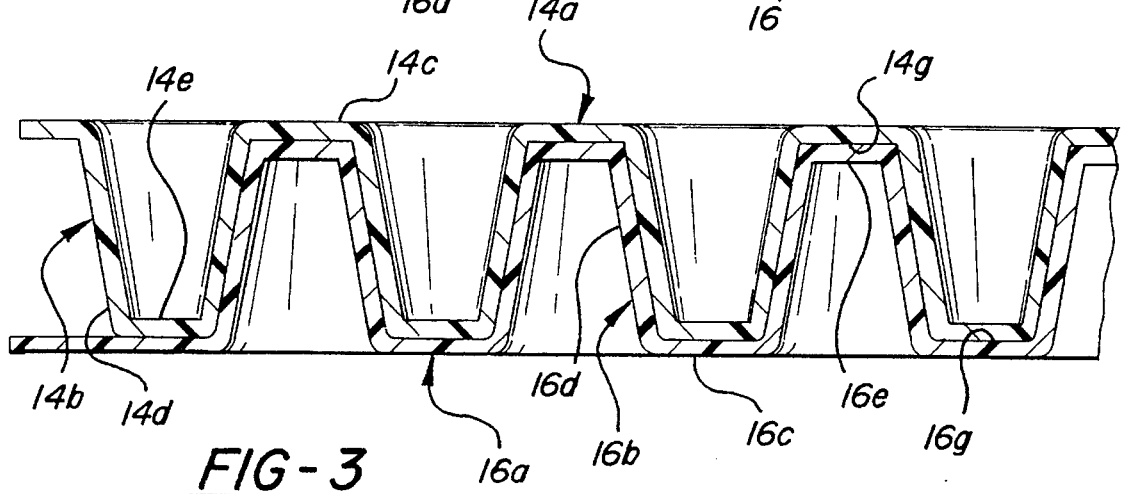

Rows 16f are also staggered, and therefore complementary, with respect to the corresponding rows 14f in the upper sheet so that when the sheets 14 and 16 are fitted together to form the panel structure, each boss 14b of upper sheet 14 fits interdigitally and complementarily between a pair of adjacent bosses 16b of the lower sheet and each boss 16b of the lower sheet fits interdigitally and complementarily between a pair of adjacent bosses 14b of the upper sheet. The downward angle or taper of the bosses 14b is complementary to the upward angle or taper of the bosses 16b so that when the bosses are fitted or meshed together, and as best seen in FIG. 2, the bosses fit together along angular interfaces 22.

Since the sheets are fitted together while still in a heated, flowable state, the bosses are fused together along their angled interfaces 22. Further, since the bosses 14b and 16b have equal vertical extents or heights, the respective walls 14e and 16e of the bosses are fused to the respective confronting faces of the main body portions of the respective sheets. Specifically, the lower or inner wall 14e of an upper sheet boss 14b is fused to the upper surface 16g of lower sheet main body portion 16a at a location between a respective pair of lower sheet bosses 16b, and the upper or inner wall 16e of a lower sheet boss 16b is fused to the lower or inner surface 14g of upper sheet main body portion 14a between a respective pair of upper sheet bosses 14b.

Figure 4:
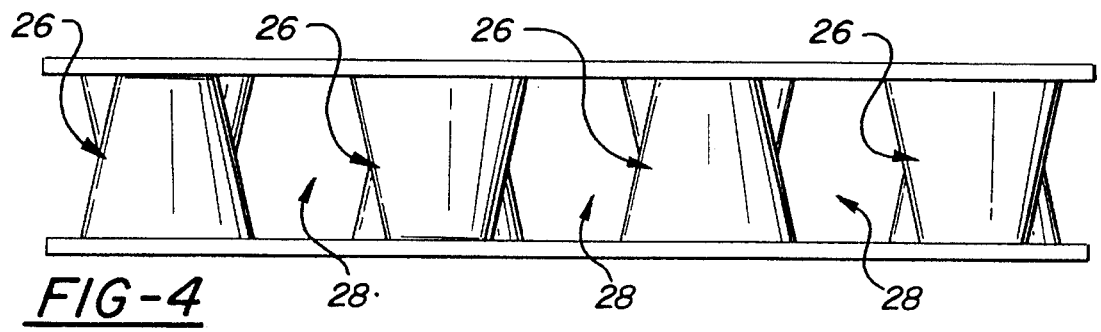
FIG. 4 is a fragmentary view looking in a direction of the arrow 4 in FIG. 1.
Figure 5:
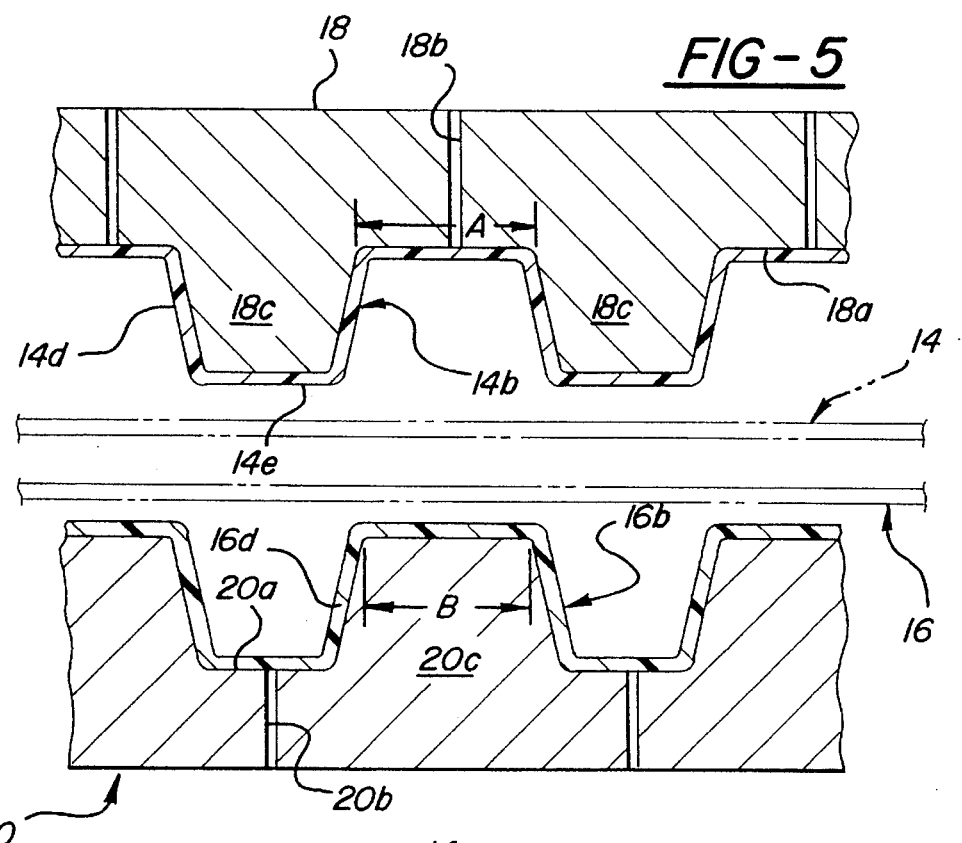
FIG. 5 is a fragmentary view showing steps in the methodology of the present invention.
Figure 8:
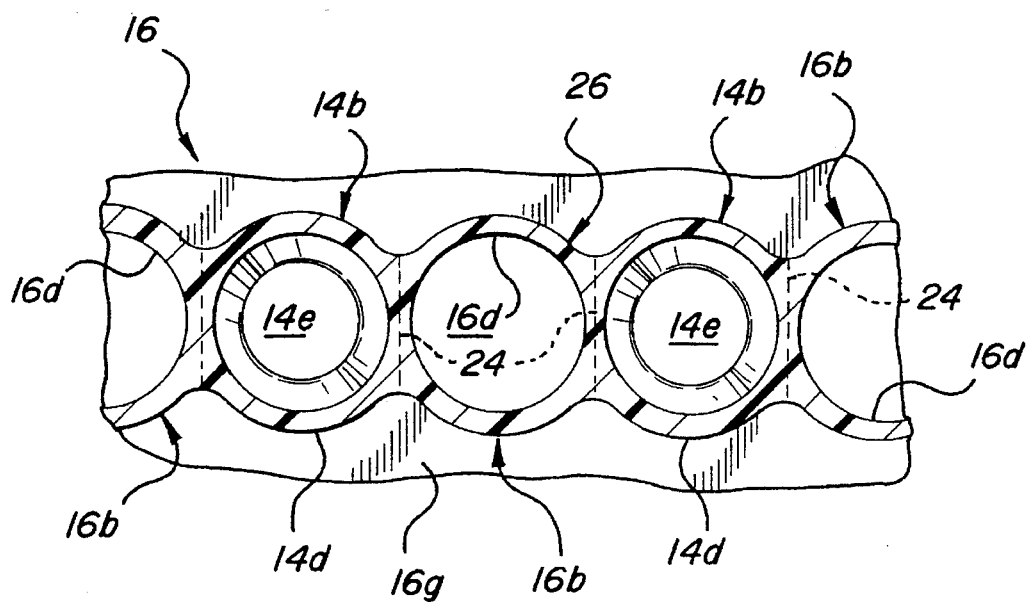
FIG. 8 is cross-sectional view taken on lines 8—8 of FIG. 6.
Figure 9:
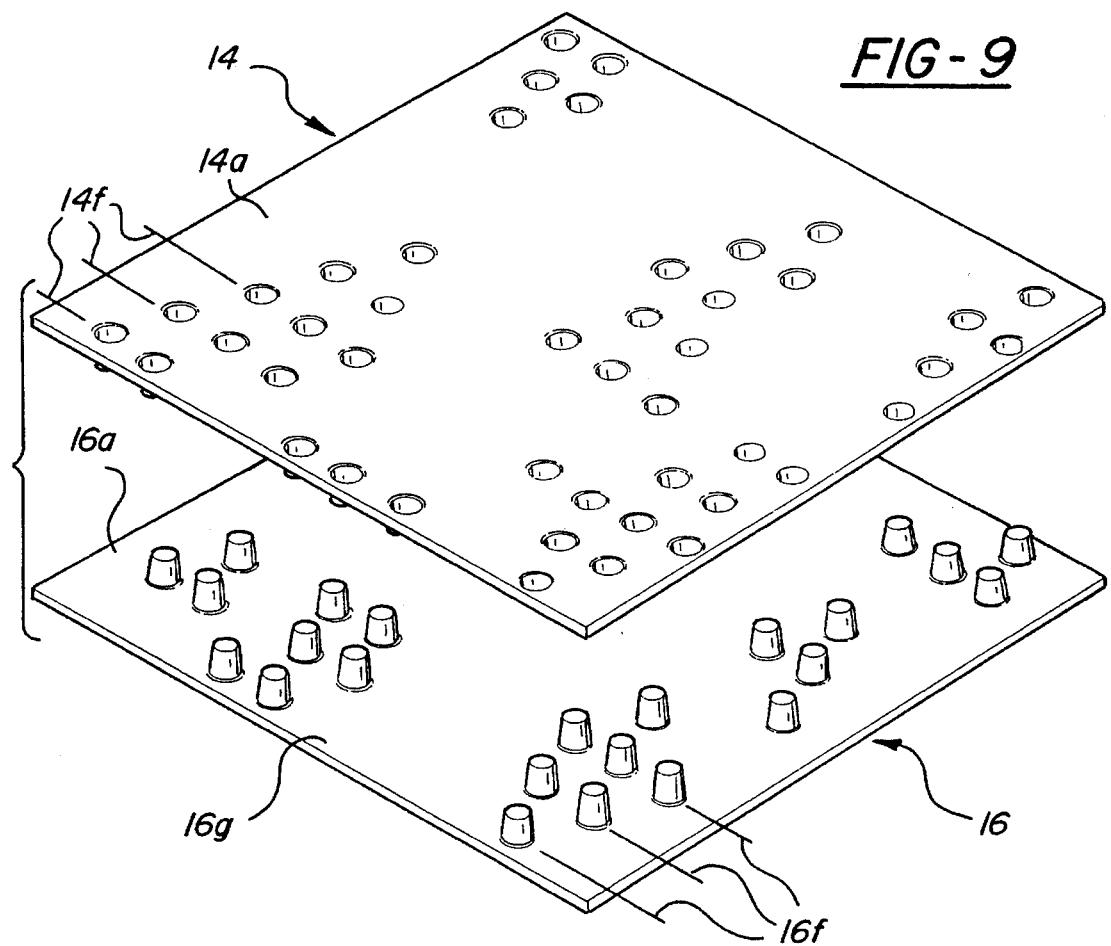
FIG. 9 is an exploded view of the invention panel structure.
Figure 10:
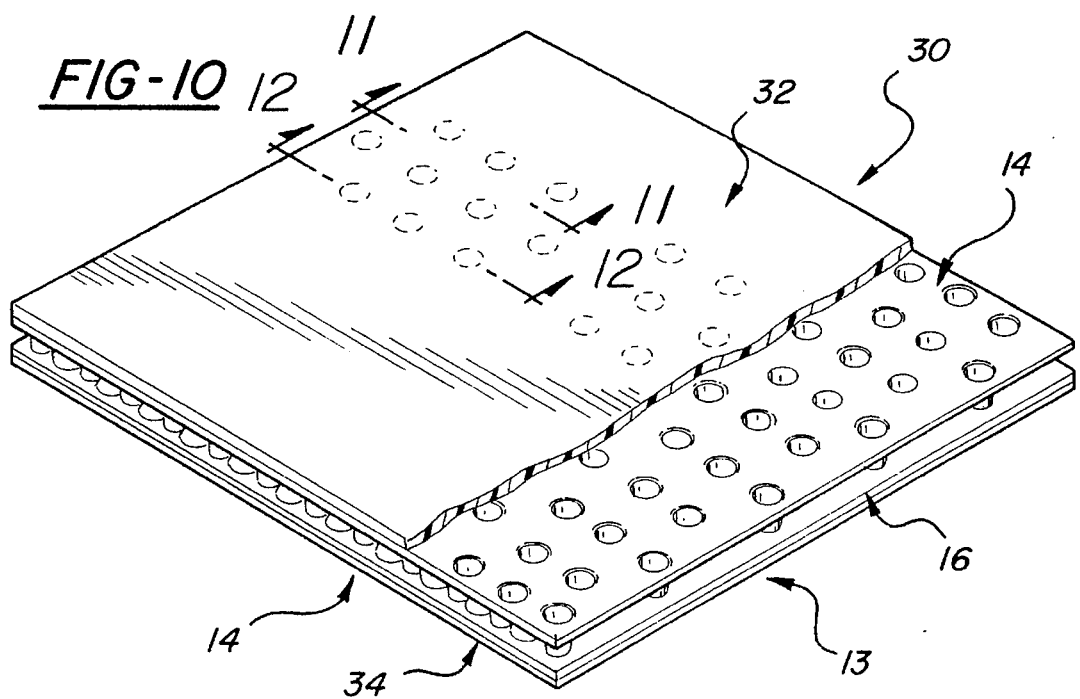
FIG. 10 is a perspective view of a further panel structure according to the invention.
Figure 11:
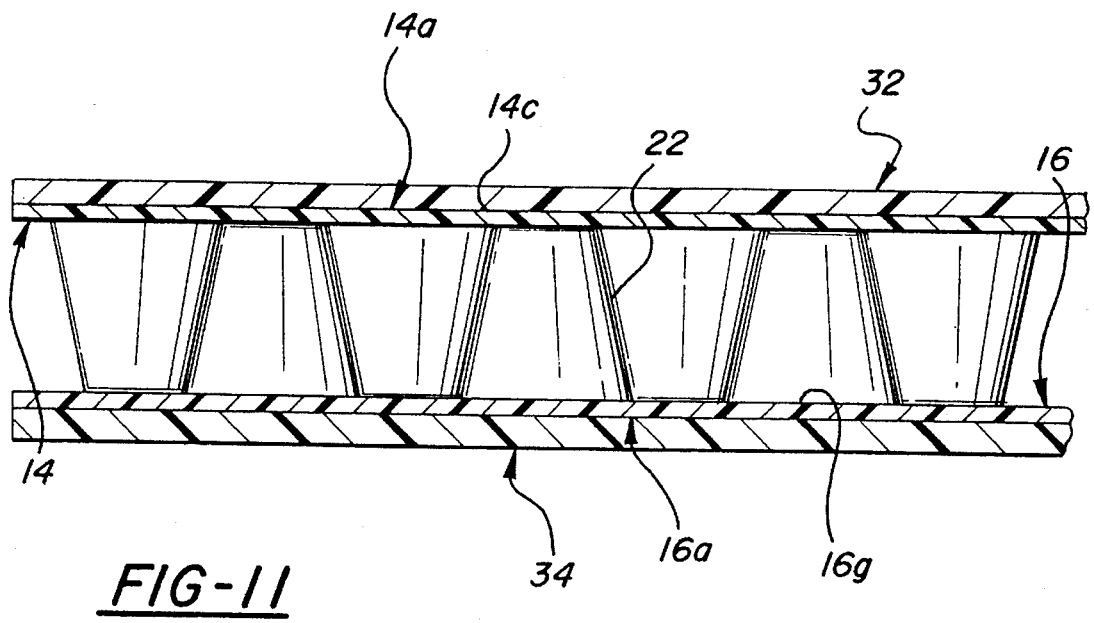
FIGS. 11 and 12 are cross-sectional views taken respectively on lines 11—11 and 12—12 of FIG. 10.
Figure 12:
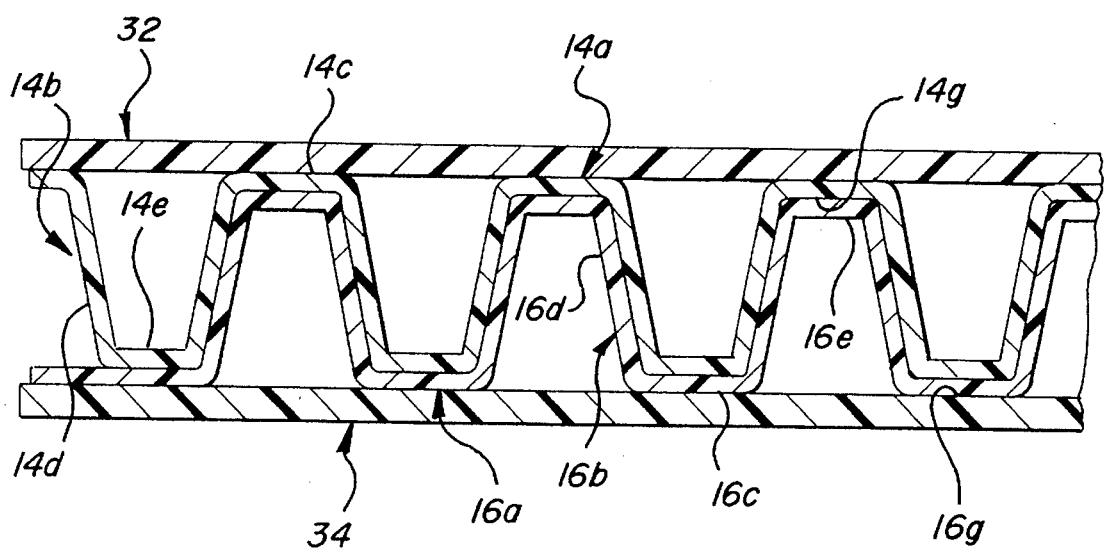

As best seen in FIG. 5, the sheets are configured such that bosses 14b and 16b have identical configurations and further such that the dimension A measured across the valley or root of the upper mold 18 between adjacent mold boss configurations 18c is identical to the dimension B measured across the top of the boss configuration 20c of the lower mold. This configuring of the upper and lower molds provides an interference or overlapping fit as between the upper and lower bosses as the sheets are pressed together so that the upper and lower bosses, rather than merely fusing along a line of angular contact, fuse along a relatively wide area of contact as seen by the dashed lines 24 in FIG. 8. As best seen in FIG. 8, the fused together bosses coact to form a plurality of rigid column structures 26 between the upper and lower sheets corresponding in arrangement and orientation to the boss rows 14f and 16f of the upper and lower sheets. As best seen in FIG. 4, spaces or openings 28, running the entire width of the panel structure, are formed between rigid column structures 26.

Figure 6:
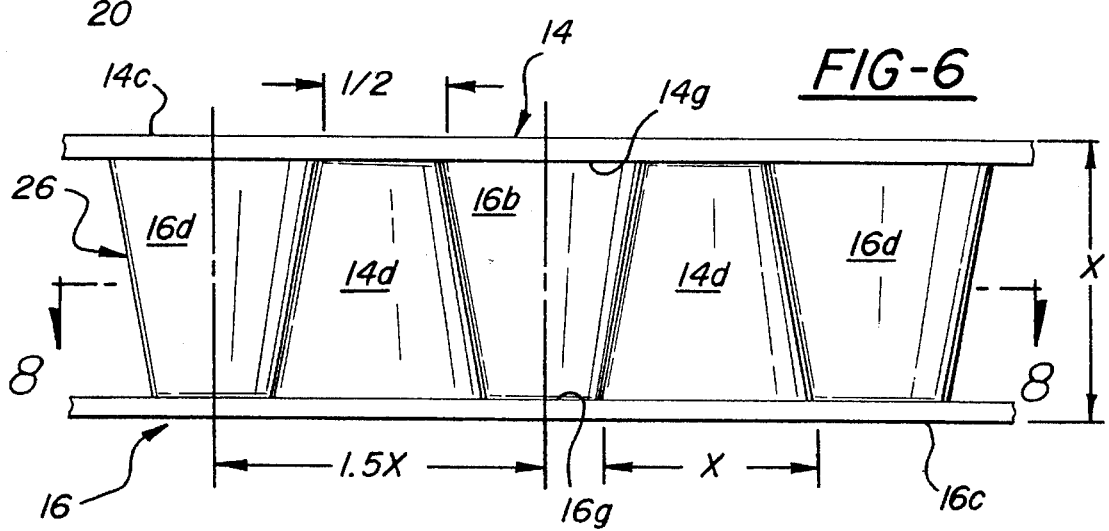
FIG. 6 is a fragmentary view on an enlarged scale looking in the direction of the arrow 6 in FIG. 1
Figure 7:
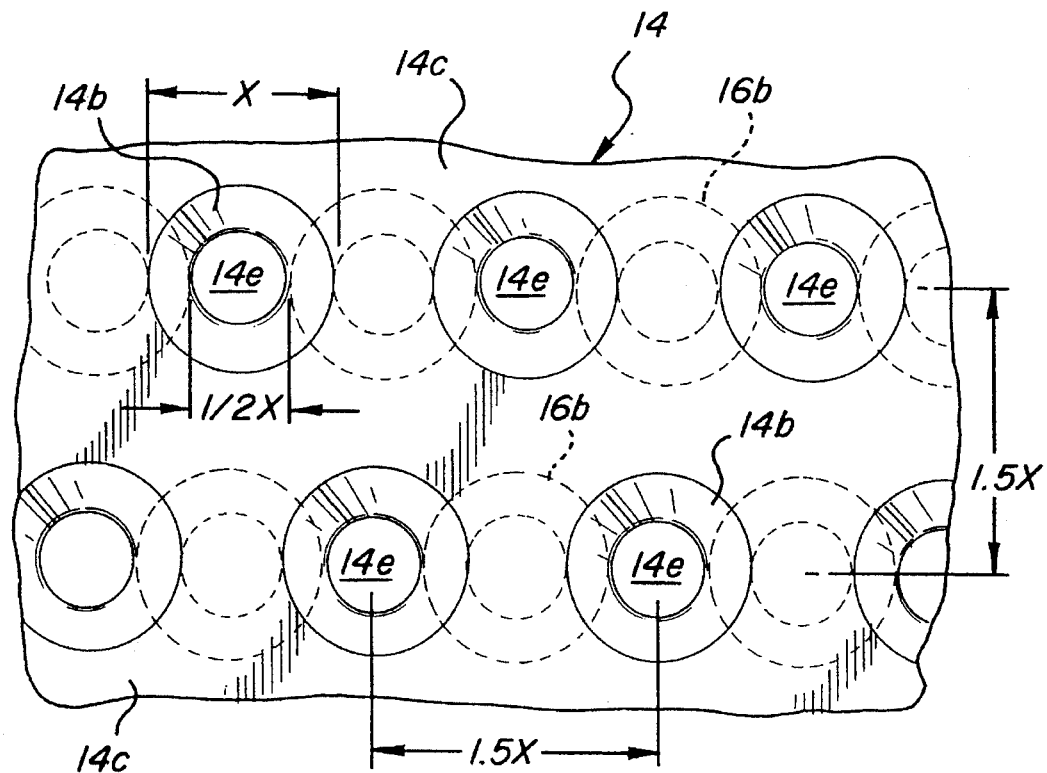
FIG. 7 is a fragmentary plan view of the invention panel structure.

Whereas the dimensions of the individual bosses, the spacing between successive bosses in each row, and the spacing between rows will vary depending upon the particular application for which the panel structure is intended, certain dimensional relationships as between the boss configurations, boss spacings, and row spacings have been found to be particularly advantageous in terms of producing an extremely strong panel structure for a given amount of plastic material. Specifically, and as best seen in FIGS. 6 and 7, a particularly strong panel structure is provided by relating the boss and other dimensions to the overall thickness X of the panel structure such that the major dimension of each boss (i.e., the dimension of the boss as it opens in the associated main body structure) is equal to X; the minor dimension of each boss (i.e., the dimension of the boss at its inner wall) is equal to one half X; the distance centerline to centerline between successive bosses in each row is equal to 1.5 X; and the distance centerline to centerline between adjacent rows is equal to 1.5 X. This specific dimensional interrelationship has been found to allow the sheets to draw smoothly, and without excessive thinning, over the respective molds to provide a final panel structure that is extremely strong and rigid in comparison to the amount of plastic material utilized.

The panel structure 30 of FIGS. 10–15 is formed from a thermoformed and selectively configured sheet 14, a thermoformed and selectively configured sheet 16, a flat cover sheet 32, and a flat lower base sheet 34.

Sheets 14 and 16 correspond to sheets 14 and 16 of the FIGS. 1–9 embodiment and, as best seen in FIGS. 11, 12, 13, and 14, fit together in complementary interdigitated fashion with the lower end 14e of each downwardly extending boss 14b fused to the upper face 16g of the main body portion 16a of sheet 16 at a location between a respective pair of upwardly extending bosses 16d; the upper end of each upwardly extending boss 16b fused to the lower face 14g of the main body portion 14a of sheet 14 between a respective pair of downwardly extending bosses 14b; and the downwardly extending and upwardly extending bosses 14b/16b fused together at their complementary interfacing annular side walls 14d/16d to form a plurality of rigid column structures between the sheet 14 and the sheet 16 corresponding in arrangement and orientation to the boss rows 14f and 16f of the sheets 14 and 16.

Figure 13:
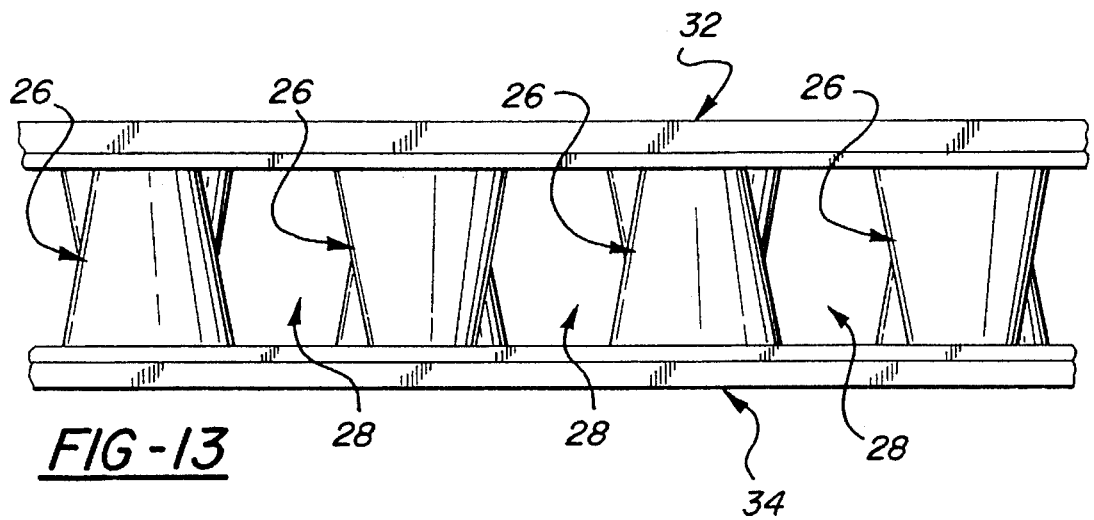
FIG. 13 is a fragmentary view looking in the direction of the arrow 13 in FIG. 10.
Figure 14:
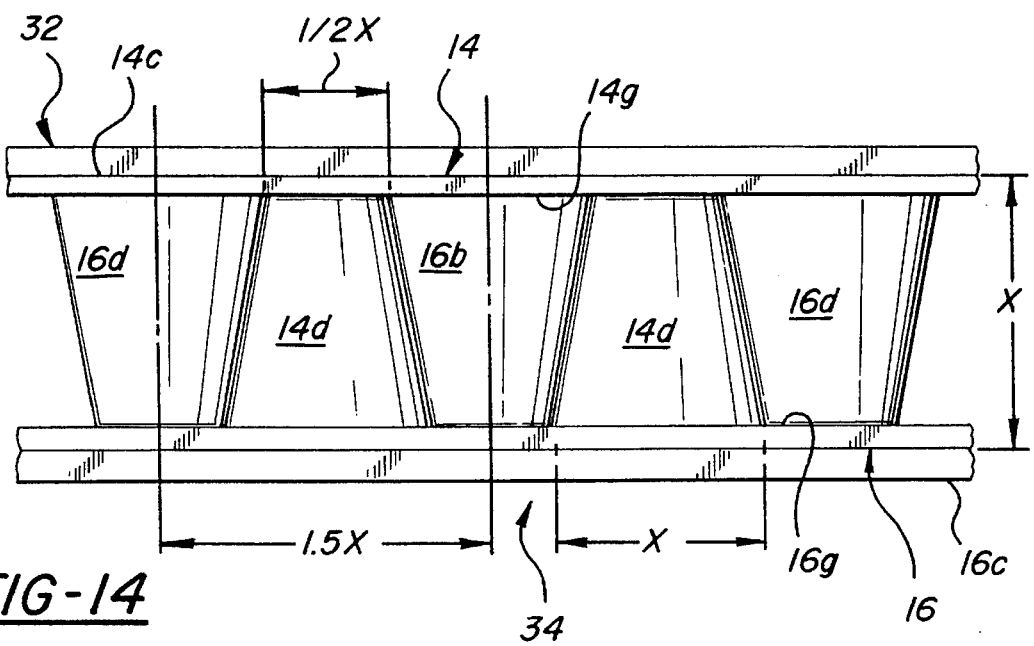
FIG. 14 is a fragmentary view on an enlarged scale looking in the direction of the arrow 14 in FIG. 10.
Figure 17:
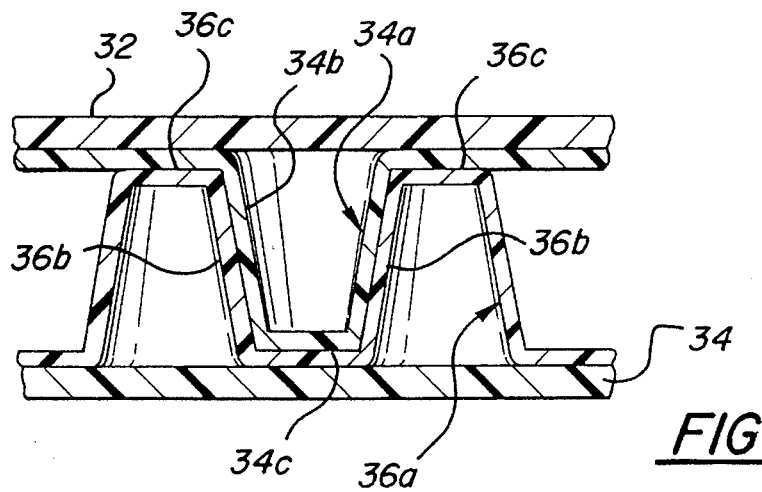
FIG. 17 is a cross-sectional view taken on line 17—17 of FIG. 16.
Figure 15:
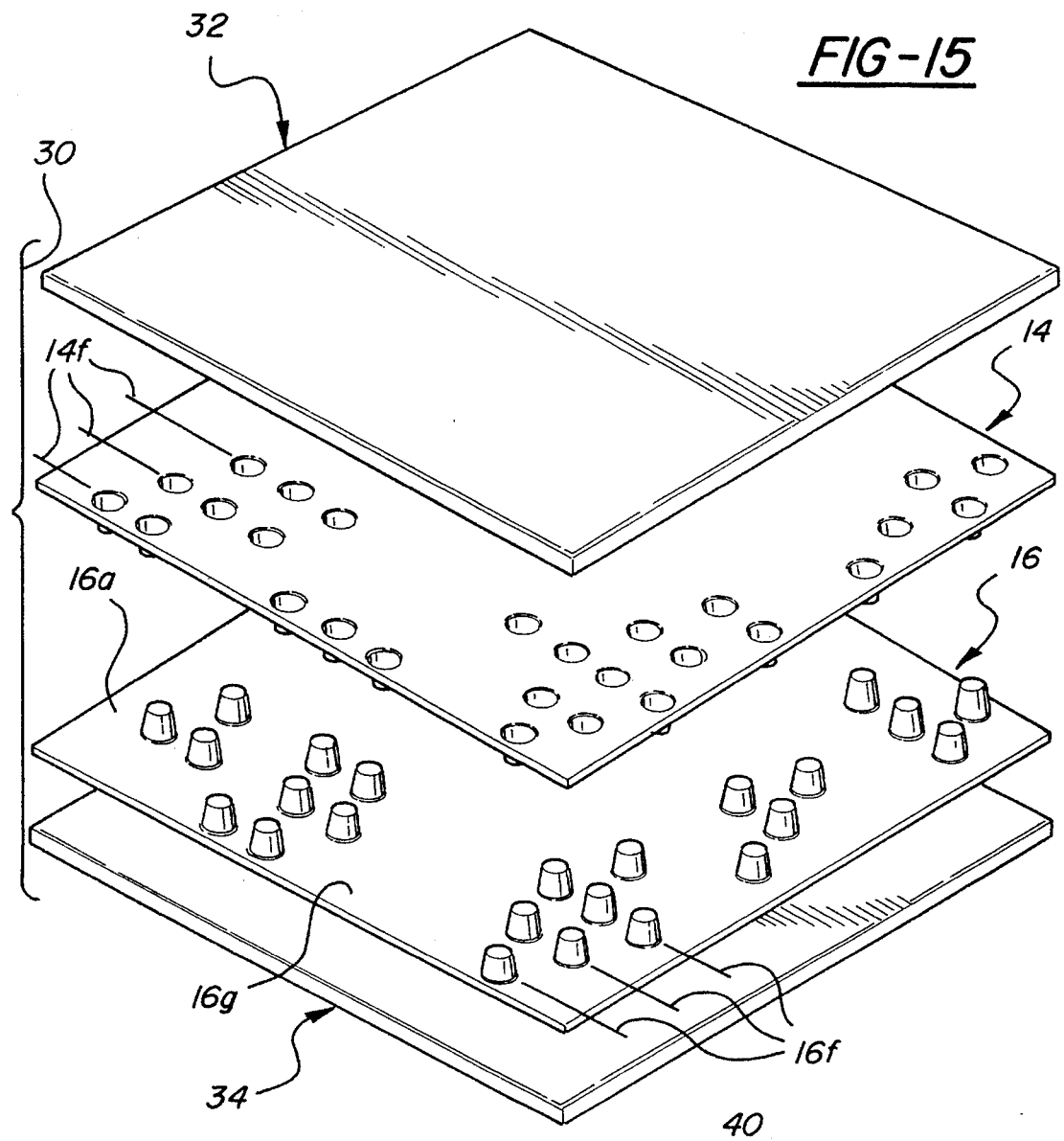
FIG. 15 is an exploded view of the panel structure of FIG. 10.

As with the FIGS. 1–9 embodiment, and as best seen in FIG. 13, spaces or openings 28, running the entire width of the sheets, are formed between the rigid column structure 26.

Flat upper cover sheet 32 is formed of the same plastic material as sheets 14 and 16 and is positioned over and fused to the upper face of the main body portion 14c of sheet 14 in overlying relation to the openings in the upper face of sheet 14 provided by bosses 14b. Upper cover sheet 32 is coextensive in length and width to sheets 14 and 16 but preferably has a thickness that is significantly greater than the thickness of the sheets 14 and 16. For example, sheets 14 and 16 may have a nominal thickness of 20 thousandths of an inch and cover sheet 32 may have a nominal thickness of 30 thousandths of an inch.

Flat lower base sheet 34 is positioned under and fused to the lower face 16c of the main body portion 16a of sheet 16 in underlying relation to the openings in the lower face of sheet 16 provided by bosses 16b. Sheet 34 is coextensive in length and width to sheets 14, 16, and 32 and preferably has a thickness greater than the thickness of sheets 14 and 16 and generally corresponding to the thickness of upper cover sheet 32.

Whereas the upper and lower bosses in the embodiments of FIGS. 1–9 and 10–15 are illustrated and described as arranged in rows with the bosses in the rows of sheet 14 offset with respect to the bosses in the rows of sheet 16 so that the downwardly extending bosses of the sheet 14 may fit interdigitally and complementarily between the bosses in the rows of the sheet 16 to form a plurality of rigid column structures between the sheets 14 and 16 corresponding in arrangement and orientation to the boss rows 14f and 16f of the sheets 14 and 16, the invention may also be carried out using other boss patterns in the sheets 14 and 16.

Figure 16:
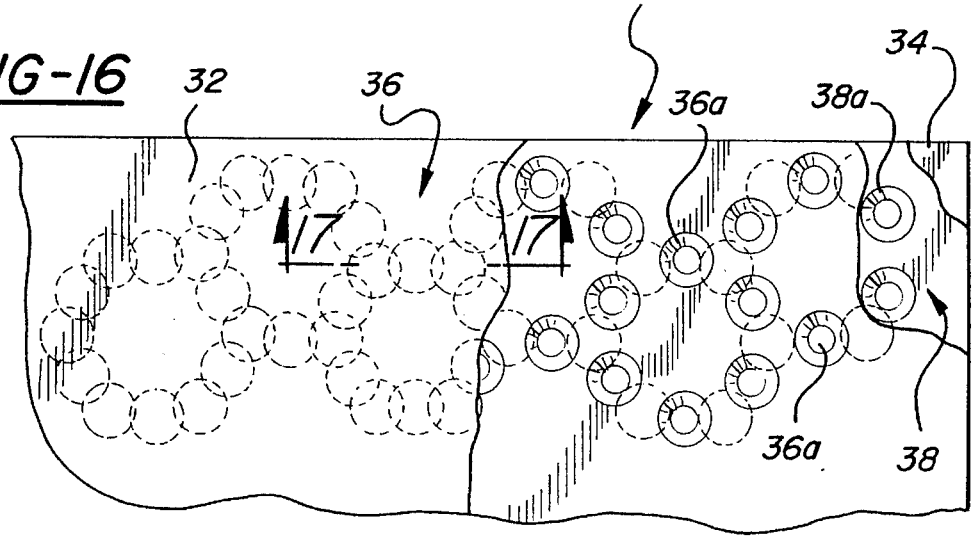
FIG. 16 is a fragmentary plan view of a modification of the panel structure of FIG. 10.

One such alternate boss pattern is seen in FIG. 16 wherein the panel structure 40 includes a flat, upper cover sheet 32, a flat lower base sheet 34, an upper intermediate sheet 36, and a lower intermediate sheet 38.

Intermediate sheets 36 and 38 have bosses 36a and 38a arranged in corresponding, complementary patterns with spaces between the bosses in each pattern so that the bosses of upper intermediate sheet 36 may fit interdigitally and complementarily with the bosses on the lower intermediate sheet. Specifically, the upper intermediate sheet 36 and lower intermediate sheet 38 each have their bosses arranged in a hexagonal pattern with the hexagonal pattern of the downwardly extending bosses 36a of the upper intermediate sheet rotated with respect to the hexagonal pattern of the upwardly extending bosses 38a of the lower intermediate sheet by 45° so that the bosses 36a may fit interdigitally and complementarily between adjacent bosses 38a on the lower intermediate sheet and so that the annular side wall portions 36b of the bosses 36a may fuse with the annular side wall portions 38b of the bosses 38a with the lower ends 36c of the bosses 36a fused to the upper face of the main body portion of the lower sheet 38 and the upper ends 38c of the bosses 38a fused to the lower face of the upper intermediate sheet 36. As with the FIGS. 10–15 embodiment, the flat upper and lower sheet 32 and 34 preferably have a thickness greater than the thickness of the intermediate sheets 36 and 38.

Figure 18:
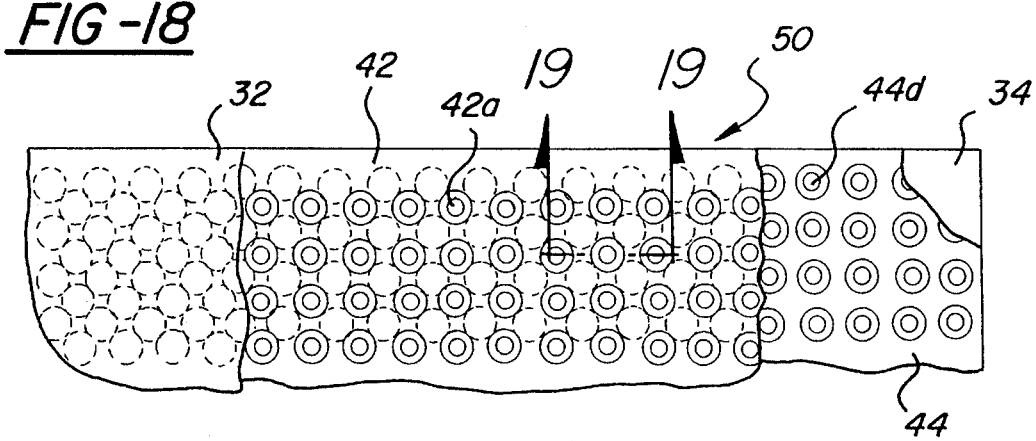
FIG. 18 is a fragmentary view of a further modification of the panel construction of FIG. 10.
Figure 19:
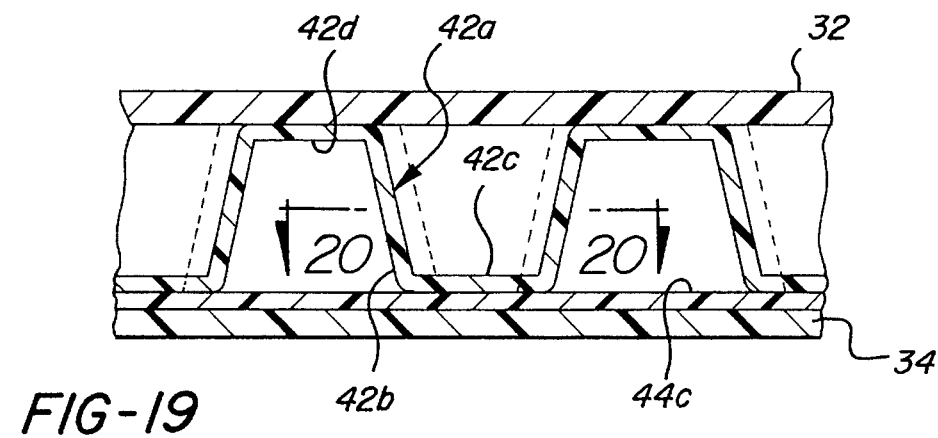
FIG. 19 is a cross-sectional view taken on line 19—19 of FIG. 18.
Figure 20:
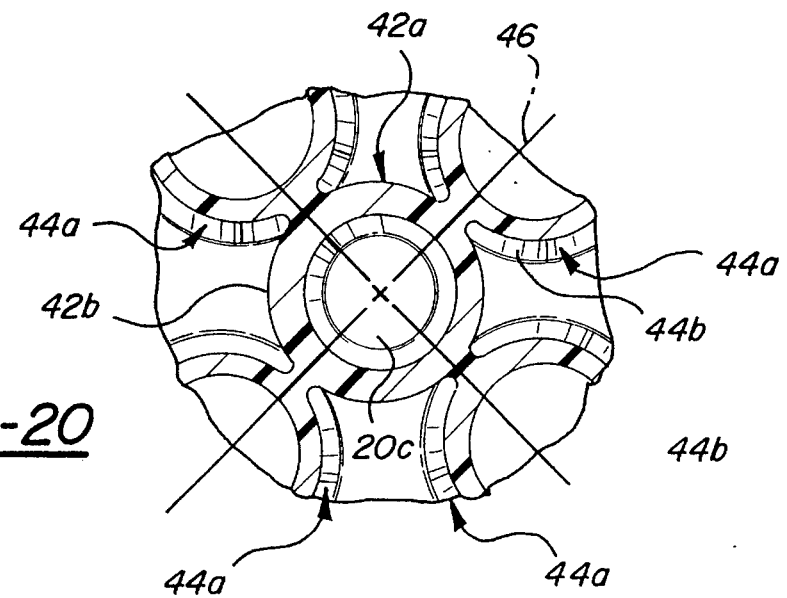
FIG. 20 is a cross-sectional view taken on line 20—20 of FIG. 19.

In the panel structure 50 of FIGS. 18–20, the upper intermediate sheet 42 has a plurality of rows of downwardly extending bosses 42a and the lower intermediate sheet 44 has a plurality of rows of upwardly extending bosses 44a arranged in a pattern that is complementary with respect to the pattern of downwardly extending bosses 42a. Specifically, the rows of bosses 44a are laterally offset with respect to the rows of bosses 42a and the bosses 44a in a given row of bosses 44a are longitudinally offset with respect to the bosses 42a in the adjacent row of bosses 42a so that, as best seen in FIG. 20, each downwardly extending boss 42a is complementarily positioned between four upwardly extending bosses 44a. The longitudinal and lateral spacings of the rows and the dimensions of the bosses are chosen such that the annular side wall portion 42b of each downwardly extending boss 42a is fused to the annular side wall portion 44b of each upstanding boss 44a to form a rigid X configuration 46 centered on each downwardly extending boss 42b (or each upwardly extending boss 44a) with the lower ends 42c of the downwardly extending bosses 42a fused to the upper face of the main body portion 44c of the lower intermediate sheet 44 and the upper ends 44d of the upwardly extending bosses 44a fused to the lower face of the main body portion 42d of the upper intermediate sheet 42.

The invention will be seen to provide a panel structure that is lightweight, strong, durable and maintenance-free, that provides all-weather performance, and that is relatively inexpensive. The invention panel structure is thereby ideally suited for a myriad of construction and fabricating applications.

With specific reference to the panel structures 30, 40, and 50 shown in FIGS. 10–20, forming the upper and lower portions of the panel structure from sheets that are separate from the sheets forming the intermediate portion of the panel structure allows the thickness of the upper and lower sheets to be determined independently of the thickness of the sheets forming the intermediate portion so that, for example, and as disclosed, the upper and lower sheets may have a greater thickness than the thickness of the sheets forming the intermediate portion with the thicknesses of the individual sheets, in any event, chosen independently of each other and with a view to providing a final desired panel structure thickness, weight, strength, and cost.

Whereas the particular plastic material utilized to form the invention pallet is not critical, it has been found that excellent results may be obtained by the use of a high density polyethylene having a density of approximately 0.950 grams per cubic centimeter.

Whereas preferred embodiments of the invention have been illustrated and described in detail, it will be apparent that various changes may be made in the disclosed embodiments without departing from the scope or spirit of the invention. For example, although the bosses have been illustrated and described as having a circular cross sectional configuration, other cross sectional configurations such as, but not limited to, rectangular or oval configurations, may be employed and the term annular as used in the claims to describe the side walls of the bosses will be understood to include any closed loop cross sectional configuration.

I claim:

1. A panel structure comprising:

a first plastic sheet having a planar main body portion and a plurality of spaced downwardly extending hollow bosses opening in the upper face of the first sheet and each including an annular side wall and a lower end;

a second plastic sheet having a planar main body portion and a plurality of spaced upwardly extending hollow bosses opening in the lower face of the second sheet and each including an annular side wall and an upper end;

the lower end of each downwardly extending boss being fused to the upper face of the main body portion of the second sheet between adjacent upwardly extending bosses and the upper end of each upwardly extending boss being fused to the lower face of the main body portion of the first sheet between adjacent downwardly extending bosses; and the annular side walls of at least some of said downwardly extending bosses being fused to the annular side walls of upwardly extending bosses of the second sheet.

2. A panel structure according to claim 1 wherein:

the downwardly extending bosses on the first sheet and the upwardly extending bosses on the second sheet are arranged in complementary patterns with spaces between the bosses in each pattern and the bosses on the first sheet are interdigitated with the bosses on the second sheet.

3. A panel structure according to claim 1 wherein the structure further includes:

a third plastic sheet positioned over and fused to the upper face of the first sheet in overlying relation to the boss openings in the upper face of the first sheet; and a fourth plastic sheet positioned under and fused to the lower face of the second sheet in underlying relation to the boss openings in the lower face of the second sheet.

4. A panel structure according to claim 2 wherein:

the downwardly extending bosses of the first sheet are arranged in parallel rows and the upwardly extending bosses of the second sheet are arranged in parallel rows that are vertically aligned with, but longitudinally staggered, with respect to the respective boss rows of the first sheet so that each boss in a given first sheet row fits between two bosses in the corresponding second sheet row.

5. A panel structure according to claim 2 wherein:

the downwardly extending bosses are arranged in hexagonal patterns and the upwardly extending bosses are arranged in hexagonal patterns that are complementary to the hexagonal patterns of the downwardly extending bosses so that the bosses of a given upwardly extending hexagonal boss pattern fit interdigitally with respect to the bosses of a corresponding downwardly extending hexagonal boss pattern.

6. A panel structure according to claim 2 wherein:

the upwardly and downwardly extending bosses are arranged in parallel rows and the upwardly extending boss rows are offset laterally and longitudinally with respect to the downwardly extending boss rows so that each boss extending in a given direction may be positioned between four bosses extending in the opposite direction.

7. A panel structure including plastic sheets arranged in layered relationship and including an upper sheet and a lower sheet, characterized in that:

the upper sheet includes a planar main body portion and a plurality of spaced downwardly extending bosses opening in the upper face of the upper sheet and each including an annular side wall and a lower end;

the lower sheet includes a planar main body portion and a plurality of spaced upwardly extending bosses opening in the lower face of the lower sheet and each including an annular side wall and an upper end;

the annular side walls of at least some of the downwardly extending bosses of the upper sheet being fused to the annular side walls of upwardly extending bosses of the lower sheet to form fused interfaces between the side walls of the upwardly and downwardly extending bosses;

each of the fused interfaces being formed of deformed portions of the annular wall of an upwardly extending boss and the annular wall of a respective downwardly extending boss;

each of the fused interfaces thus formed extending along a relatively wide area of contact so as to define a relatively wide area of fused together contact between the respective upwardly and downwardly extending side walls.

8. A panel structure according to claim 7 wherein:

the downwardly extending bosses on the upper intermediate sheet and the upwardly extending bosses on the lower intermediate sheet are arranged in complementary patterns with spaces between the bosses in each pattern and the bosses on the upper intermediate sheet are interdigitated with the bosses on the lower intermediate sheet.

9. A panel structure according to claim 7 wherein the bosses of said upper sheet are arranged in hexagonal patterns, the bosses of said lower sheet are arranged in hexagonal patterns that are complementary to the hexagonal patterns of the bosses of the upper sheet, and the bosses of a given hexagonal boss pattern of the upper sheet fit interdigitally with respect to the bosses of a corresponding hexagonal boss pattern of the lower sheet.

10. A panel structure according to claim 7 wherein the bosses on said upper and lower sheets are arranged in parallel rows, and the boss rows of the upper sheet are offset laterally and longitudinally with respect to the boss rows of the lower sheet so that each boss of the upper sheet may be positioned between four bosses of the lower sheet.

11. A panel structure comprising:

a first plastic sheet having a planar main body portion and a plurality of spaced downwardly extending hollow bosses opening in the upper face of the first sheet and each including an annular side wall and a lower end;

a second plastic sheet having a planar main body portion and a plurality of spaced upwardly extending hollow bosses opening in the lower face of the second sheet and each including an annular side wall and an upper end;

the lower end of each downwardly extending boss being fused to the upper face of the main body portion of the second sheet between adjacent upwardly extending bosses, the upper end of each upwardly extending boss being fused to the lower face of the main body portion of the first sheet between adjacent downwardly extending bosses, and the annular side walls of at least some of said downwardly extending bosses of said first sheet being fused to the annular side walls of upwardly extending bosses of the second sheet;

a third plastic sheet positioned over and fused to the upper face of the first sheet in overlying relation to the boss openings in the upper face of the first sheet; and a fourth plastic sheet positioned under and fused to the lower face of the second sheet in underlying relation to the boss openings in the lower face of the second sheet.

12. A panel structure including four plastic sheets arranged in layered relationship and including an upper sheet, a lower sheet, an upper intermediate sheet positioned beneath the upper sheet, and a lower intermediate sheet positioned between the upper intermediate sheet and the lower sheet, characterized in that:

the upper intermediate sheet includes a planar main body portion and a plurality of spaced downwardly extending bosses opening in the upper face of the upper intermediate sheet and each including an annular side wall and a lower end;

the lower intermediate sheet includes a planar main body portion and a plurality of spaced upwardly extending bosses opening in the lower face of the lower intermediate sheet and each including an annular side wall and an upper end;

the lower ends of the downwardly extending bosses are fused to the upper face of the lower intermediate sheet between adjacent upwardly extending bosses;

the upper ends of the upwardly extending bosses are fused to the lower face of the upper intermediate sheet between adjacent downwardly extending bosses;

the annular side walls of at least some of the downwardly extending bosses of the upper intermediate sheet are fused to the annular side walls of upwardly extending bosses of the lower intermediate sheet;

the upper sheet is fused to the upper face of the upper intermediate sheet in overlying relation to the boss openings in the upper intermediate sheet; and the lower sheet is fused to the lower face of the lower intermediate sheet in underlying relation to the boss openings in the lower intermediate sheet.

13. A laminated plastic panel structure including first, second and third plastic sheets, characterized in that:

the first sheet includes a planar main body portion and a plurality of spaced downwardly extending bosses opening in the upper face of the first sheet and each including an annular side wall and a lower end;

the second sheet is positioned beneath the first sheet and includes a main body portion and a plurality of spaced upwardly extending bosses opening in the lower face of the second sheet and each including an annular side wall and an upper end;

the lower ends of the downwardly extending bosses are fused to the upper face of the second sheet between adjacent upwardly extending bosses;

the upper ends of the upwardly extending bosses are fused to the lower face of the first sheet between adjacent downwardly extending bosses;

the annular side walls of at least some of the downwardly extending bosses of the first sheet are fused to the annular side walls of upwardly extending bosses of the second sheet; and the third sheet comprises a flat sheet fused to the upper face of the first sheet in overlying relation to the boss openings in the first sheet.

14. A panel structure according to claim 13 wherein:

the downwardly extending bosses of the first sheet and the upwardly extending bosses of the second sheet are arranged in complementary patterns with spaces between the bosses in each pattern and the bosses on the first sheet are interdigitated with the bosses on the second sheet.

15. A panel structure according to claim 13 wherein:

the third sheet has a greater thickness than the first and second sheets.

16. A panel structure according to claim 3 wherein:

the panel structure further includes a fourth plastic sheet comprising a flat sheet fused to the lower face of the second sheet in underlying relation to the boss openings in the second sheet.

17. A twin sheet panel structure comprising a first plastic sheet including a planar main body portion having inner and outer surfaces and a second plastic sheet positioned in parallel spaced relation to said first plastic sheet and including a main body portion having inner and outer surfaces the first sheet further including a plurality of spaced hollow bosses opening in the outer surface of the first sheet main body portion and including annular side wall portions extending inwardly from said first sheet main body portion, the second plastic sheet further including a plurality of spaced hollow bosses opening in the outer surface of the second sheet main body portion and including annular wall portions extending inwardly from said second sheet main body portion characterized in that the annular side wall portions of some of said first sheet bosses are fused to the annular side wall portions of some of said second sheet bosses.

* * * * *